United States Patent [19]
Sato et al.

[11] Patent Number: 5,953,134
[45] Date of Patent: *Sep. 14, 1999

[54] IMAGE FORMING APPARATUS AND IMAGE FORMING METHOD USED IN THE SAME

[75] Inventors: Akihiko Sato; Kiyoshi Ishikawa; Yuji Akiyoshi; Akiyoshi Inoue; Hiroaki Ishizawa; Yoshiharu Namba, all of Ebina, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,778

[22] Filed: Oct. 18, 1996

[51] Int. Cl.⁶ .......................... H04N 1/00; H04N 1/387; H04N 1/04; G06F 15/00
[52] U.S. Cl. ..................... 358/488; 358/404; 358/450; 358/488; 395/114
[58] Field of Search .................................. 358/404, 450, 358/488; 395/114

[56] References Cited

FOREIGN PATENT DOCUMENTS

| | | |
|---|---|---|
| A-63-42280 | 2/1987 | Japan . |
| A-63-191469 | 8/1988 | Japan . |

*Primary Examiner*—Edward L. Coles
*Assistant Examiner*—Twyler Lamb
*Attorney, Agent, or Firm*—Oliff & Berridge PLC

[57] ABSTRACT

An image forming method for use in image forming apparatus including on the right surface thereof a discharge opening connectable with a post-processing device, the image forming method comprising the steps of:

a first step of delivering one or more documents to a read position sequentially starting from the first document to read the documents at the read position, and outputting the documents in the form of images of the same posture as document images to be read on the documents;

a second step of reading a document at a position where the same is placed and outputting the document in the form of an image of the same posture of a document image to be read on the document;

a third step of forming, on the upper surface of a sheet to be supplied from the left surface side of the image forming apparatus, the images output in the first or second step in the order that they are read, and delivering the formed images in a direction of the right surface of the image forming apparatus; and a fourth step of reversing the sheet in such a manner that the upper surface of the sheet on which the images are formed in the third step is turned over to the lower surface of the sheet, and discharging the reversed sheet to the discharge opening.

9 Claims, 4 Drawing Sheets

IMAGE FORMING APPARATUS AND IMAGE FORMING METHOD USED IN THE SAME

BACKGROUND OF THE INVENTION

The present invention relates to image forming apparatus such as a digital copying machine or the like which stores image formation read out from a document in a memory as digital information and then forms a visible image on a recording sheet based on the stored digital information, and an image forming method used in the same image forming apparatus.

In a digital copying machine, since a visible image is formed on a recording sheet by use of digital image information once stored in a memory, if the digital information is formed by reading out a document image from a document, then the image can be formed on a desired number of sheets using such digital image information. Therefore, the digital copying machine is suitable to produce a plurality of copies of the document, especially, it is suitable to produce a plurality of copies of two or more sheets of documents, the digital copying machine is also able to process and output the stored digital image information with ease, and the digital copying machine is further able to exchange necessary image information with other image forming apparatus such as a facsimile, a printer or the like.

For these reasons, in recent years, use of such a digital copying machine has been started not only from the viewpoint of copying a plurality of copies of two or more sheets of documents but also from the viewpoint of establishing an on-line network with other image forming apparatus such as a facsimile, a printer or the like.

And, in such a digital copying machine, considering that an on-line network can be established for the formed digital image formation and also that, in the production of a plurality of copies of two or more sheets of documents, the first copy can be discharged as fast as possible, it is desired that the two or more sheets of documents may be read and processed in a so called 1→N order in which the items of the documents are read and processed sequentially from the 1st item thereof to the final or the N-th item.

On the other hand, in a use in which a plurality of copies must be produced from each of such two or more sheets of documents, the number of recording sheets copied and discharged out from the copying machine is large, which increases the amount of operation of post-processing operations such as a fold collecting operation, a stapling operation, a punching operation and other similar operations to thereby increase an operator's load. For this reason, there has been often added a post-processing device which is used to collect, staple and punch the folds of the recording sheets.

In such a post-processing device, from the viewpoint that an operator can replace staples efficiently as well as that the staples can be applied to recording sheets of different sizes properly, the stapling position of the staplers to be hit by a stapler must be specially set at a position which is situated on the body side of the copying machine and on the near side of the machine body to the operator. For this reason, in a copying machine to which such post-processing device is additionally attached, the recording sheets, which have been copied, must be discharged in such a manner that the stapling positions thereof are in agreement with the hitting positions of the stapled. For example, the recording sheets after being copied must be discharged such that, when the direction of discharge of the recording sheets is in the right direction of the copying machine body (a so called right discharge), the stapling positions of the recording sheets are situated on the right and near side (that is, on the right side and on the near side to the operator) of the copying machine body and, on the other hand, when the discharge direction of the recording sheets is in the left direction of the copying machine body (a so called left discharge), the stapling positions of the recording sheets are situated on the left and near side of the copying machine body to the operator.

Also, in the image forming means of the copying machine, as a technology relating to the transfer position of a visible image, that is, at which position of a latent image carrier such as a photoconductor drum, a photoconductor belt or the like the visible image is transferred onto the recording sheet, there are actually employed three kinds of transfer technologies: that is, a first technology in which the visible image is transferred at a position of 6 o'clock in the lower portion of the latent image carrier (bottom transfer technology); a second technology in which the visible image is transferred at a position of 9 o'clock (or 3 o'clock) situated laterally of the 6 o'clock position (side transfer technology); and, a third technology in which the visible image is transferred at a position of 12 o'clock situated upwardly of the 12 o'clock position (top transfer technology). However, in the side and top transfer technologies, there is required delivery means which delivers the recording sheet with the unfixed visible image carried thereon in the vertical direction, or delivers the recording sheet with the unfixed visible image carried on the lower surface side thereof during the time from transfer of the visible image to the recording sheet to fixing of the visible image. Also, since the unfixed visible image is easily damaged, the delivery means must be structured in a very complicated manner, which results in increased cost. In view of this, with respect to the transfer position of the present image forming means, considering the stability or reliability of the image quality or the delivery efficiency of the recording sheet after being transferred, it is preferred to employ the bottom transfer technology in which the visible image is transferred at the 6 o'clock position in the lower portion of the latent image carrier.

By the way, in this type of copying machine, the document to be copied varies in size and form, that is, it ranges widely from a very soft sheet type of document to a thick and rigid sheet type of document and further includes sheets of documents which have been bound into a book. Especially, the documents bound as a book cannot be delivered to the reading position of the document image by an automatic document feed device and, therefore, there is indispensable conventional type document reading means in which the documents are placed on a platen and are scanned for reading the images of the documents. These circumstances are quite the same in the digital copying machine as well.

For this reason, in the digital copying machine, in order to make good use of its strong point that it is suitable to make a large number of copies of numerous sheets of documents, it is desirable to employ automatic document feed and read means of a scan type which scans a sheet of document while the front and back of the document sheet are being naturally reversed to each other to thereby read the image of the document as digital image information. At the same time, it is also necessary to provide document read means which scans a document on a platen and reads the image of the document as digital image information. In this case, in order to make the best use of the strong point of the digital copying machine that the digital image information formed by reading the document image by means of the automatic document feed and read means can be combined with the digital image information read by the document read means to thereby edit them, it is desirable that the state of the digital image information to be formed by the document read means is matched with the state of the digital image information to be formed by the automatic document feed and read means.

Under these circumstances, the present inventors have studied carefully a digital copying machine which incorporates therein a scan type of automatic document feed and read means. In more particular, the present inventors have elaborately examined such digital copying machine in which, when the above-mentioned bottom transfer technology is employed as a technology relating to the transfer position of the image forming means thereof and also the above-mentioned post-processing device is additionally attached thereto, the recording sheet after being copied is discharged in such a manner that the staple position thereof is situated on "the body side and on the near side of the body of the copying machine" to the operator due to the condition relating to the hitting position of a staple by a stapler, when producing a plurality of copies of two or more sheets of documents, a document reading operation and a document image forming operation are carried out in parallel to thereby improve the efficiency of a copying processing operation so that the sheets of documents are read in the order of 1→N in which the first copy can be discharged earlier than other copies, and the digital image information to be formed by the above-mentioned automatic document feed and read means can be matched with the digital image information to be formed by the document read means.

In the process of careful study of the digital copying machine of the above type, the present inventors have found it possible to solve the above-mentioned problem by constructing the digital copying machine in the following structure: that is, in the automatic document feed and read means, a document, which is placed on the automatic document feed and read means in such a manner that the front surface of the document faces up and the top and bottom sides thereof are arranged correctly, is pulled in from above to be naturally reversed inside out in such a manner that the front and back surfaces of the document are reversed to each other, is then scanned in a forward or positive scan direction in which the document is moved from the left side of the present feed and read means to the right side thereof, whereby two or more sheets of documents can be read in the order of 1→N and the documents can be read in the form of digital image information having the same erect posture as the document images formed on the present documents; in the document read means which reads the document on the platen, the digital image information, which has been read and reversed in such a manner that the right and left sides thereof have been reversed to each other (that is, mirror image reversal), is output as it is to the image forming means; there is provided delivery means which allows the recording sheet to pass through the lower portion of the latent image carrier of the image forming means from the right side of the copying machine body to the left side thereof; and, there is employed a right discharge technique in which the recording sheet, after it is copied, is naturally reversed inside out and is discharged to the right side of the copying machine body. However, in such a digital copying machine, since it is necessary to discharge the recording sheet after being copied to the right side of the machine body while reversing it inside out naturally, the delivery path of the recording sheet becomes longer due to the natural reversal thereof. Also, it is difficult to set the recording sheet delivery path at a proper position, considering its relationship with respect to the latent image carrier of the image forming means, that is, from the viewpoint of design, it is difficult to employ such recording sheet delivery path.

In view of this, the present inventors have studied further and found it possible to solve the above problem by constructing the digital copying machine in the following structure: that is, in the automatic document feed and read means, a document, which is placed on the automatic document feed and read means in such a manner that the front surface of the document faces up and the top and bottom sides thereof are arranged correctly, is pulled in from above to be naturally reversed inside out such that the front and back surfaces of the document are reversed to each other, is scanned in a forward or positive scan direction in which the document is moved from the left side of the present feed and read means to the right side thereof, whereby two or more sheets of documents can be read in the order of 1→N and the documents can be read in the form of digital image information having the same erect posture as the document images formed on the present documents; in the document read means which reads the document on the platen, the digital image information that has been read thereby is output to the image forming means as the digital image information of the same erect posture as the digital image information that is finally formed by the automatic document feed and read means; there is employed a right discharge technique in which the recording sheet, after it is copied, is discharged to the right side of the copying machine body; and, in the recording sheet discharge operation, the recording sheet with a visible image fixed thereto is reversed inside out before the recording sheet is discharged.

SUMMARY OF THE INVENTION

Accordingly, it is an object of the invention to provide image forming apparatus such as a digital copying machine incorporating therein automatic document feed and read means of a scan type, which is excellent in the stability and reliability of the quality of an image formed as well as in the efficiency of the delivery of a recording sheet after image transfer, makes it possible that the discharge position and direction of the recording sheet can be set on the right and near side to the operator of the apparatus or machine body that is suitable to hit a staple by means of a stapler, and can make the best use of a digital copying machine and can improve the copying processing thereof in efficiency to thereby be able to discharge the first copy as fast as possible, and an image forming method used in the same image forming apparatus.

In attaining the above object, according to the first invention (claim 1), there is provided an image forming method for use in image forming apparatus including on the right surface thereof a discharge opening connectable with a post-processing device, the image forming method comprising: a first step of delivering one or more documents to a read position sequentially starting from the first document to read the documents at the above-mentioned read position, and outputting the documents in the form of images of the same posture as document images to be read on the present documents; a second step of reading a document at a position where the same is placed, and outputting the document in the form of an image having the same posture of as a document image to be read on the present document; a third step of forming, on the upper surface of a sheet to be supplied from the left surface side of the present image forming apparatus, the images output in the first or second step in the order that they are read, and delivering the thus formed images in a direction of the right side surface of the present apparatus; and, a fourth step of reversing the sheet upside down such that the upper surface of the sheet on which the images are formed in the third step is turned over to the lower surface of the sheet, and discharging the thus reversed sheet to the above-mentioned discharge opening.

In other words, according to the first invention, in the first step (an operation to read moving documents), the documents are delivered sequentially starting from the first document to the read position and are then read at the read position in this order (a so called reading in the order of 1→N), and the thus read documents are output as images having the same posture as the document images to be read on the present documents; and, in the second step (an operation to read fixed documents), the documents are respectively read at positions where they are placed, and the thus read documents are then output as images having the same posture as the document images to be read on the present documents. In both of these two kinds of reading techniques, since the documents are output in the form of images having the same posture as the document images to be read, not only it is easy to edit the images but also the next image forming operation and the post-processing thereof are easy. The images of the same posture as the document images to be read, in the third step, are formed in the order that they are read onto the upper surface of a sheet to be supplied from the left surface side of the present image forming apparatus (which corresponds to the bottom transfer), and, further, in the fourth step, the sheet is reversed upside down in such a manner that the upper surface of the sheet with the images formed thereon can be turned over to the lower surface of the sheet, and the thus reversed sheet is then discharged to the discharge opening formed on the right side of the present image forming apparatus. As a result, in both of the above two kinds of reading techniques, the image formation can be achieved stably by a simple structure. Also, since the sheet to be discharged is discharged in such a manner that the left side of the document is always situated on the left side of the sheet and the left side of the sheet is situated on the discharge opening side, the post-processing can be carried out easily regardless of the size of the sheet.

Also, according to the second invention (claim 2) using the image forming method according the first invention, there is provided image forming apparatus including on the right surface thereof a discharge opening connectable with a post-processing device, the image forming apparatus comprising: first read means for delivering one or more documents to a read position sequentially starting from the first document to read the documents at the above-mentioned read position, and outputting the documents in the form of images having the same posture as document images to be read on the present documents; second read means for reading a document at a position where the same is placed and outputting the document in the form of an image having the same posture as a document image to be read on the present document; image forming means for forming, on the upper surface of a sheet to be supplied from the left surface side of the present image forming apparatus, the images output in the first or second step in the order that they are read, and delivering the thus formed images in a direction of the right side surface of the present image forming apparatus; and, reversing means for reversing the sheet upside down in such a manner that the upper surface of the sheet on which the images are formed in the third step is turned over to the lower surface of the sheet, and discharging the reversed sheet to the above-mentioned discharge opening.

In the second invention as well, since the image forming method according to the first invention is applied thereto, in both of the first reading means (means to read a moving document) and the second reading means (means to read a fixed document), not only it is easy to edit the images but also the image formation and post-processing with respect to the sheet can be facilitated. That is, the image formation can be achieved stably by a simple structure as well as the post-processing with respect to the sheet to be discharged can be performed easily regardless of the size of the sheet.

Here, let us assume that the first read means (means to read a moving document) does not perform an image processing but only reads the document as well as selects the direction of delivery of the document in which an image of the same posture as the document image to be read can be obtained. For example, when the first read means reads the document from below with respect to the document surface to be read and also the document delivery direction at the read position is the right direction, the second read means can be structured in the following three manners.

That is, in a preferred embodiment of read means according to the second invention, the second read means includes: a light transmissive document placement member on which the document can be placed; scan means, with the left portion of the document placement member as the placement standard of the document, for carrying out not only a main scanning operation to scan the document through the document placement member in the far side direction to the operator with respect to the document surface to be scanned but also a sub-scanning operation to scan the document in a direction which extends at a right angle to the far-side direction and also extends on the same direction (i.e. the right direction) as the document delivery direction at the read position of the first read means; reversing means for reversing image information, which is obtained as the results of the scanning operations by the scan means, in the direction which directs the far and near sides thereof to the operator; and, rotating means for rotating by 180° the image information reversed by the reversing means.

In another preferred embodiment of read means according to the second invention, the second read means includes: a light transmissive document placement member on which the document can be placed; and, scan means, with the left portion, for example, the left and far portion, of the document placement member as the placement standard of the document, for carrying out not only a main scanning operation to scan the document through the document placement member in the far side direction to the operator with respect to the document surface to be scanned, for example, from the far side of the document surface to be scanned toward the near side thereof, but also a sub-scanning operation to scan the document in a direction which extends at a right angle to the far-side direction the far and near sides to the operator and also extends in the direction opposite to the document delivery direction (i.e. the left direction) at the read position of the first read means.

In still another preferred embodiment of read means according to the second invention, the second read means includes: a light transmissive document placement member on which the document can be placed; and, scan means, with the right portion, for example, the right and far portion, of the document placement member as the placement standard of the document, for carrying out not only a main scanning operation to scan the document through the document placement member in the far side direction to the operator with respect to the document surface to be scanned, for example, from the far side of the document surface to the operator to be scanned toward the near side thereof to the operator, but also a sub-scanning operation to scan the document in a direction which extends at a right angle to the far-side direction and also extends in the direction opposite to the document delivery direction (i.e. the left direction) at the read position of the first read means.

When the present image forming apparatus is structured in the above-mentioned manner, in both of the first and second read means, the sheet to be discharged can be arranged such that the upper left portion thereof corresponding to the document is always disposed not only on the discharge opening side but also on the left and near side to the operator regardless of the size of the sheet, for example, the stapling positions of staples to be hit by a stapler can be matched with each other, which makes it easy to perform a stapling operation. That is, the present structure makes it possible to carry out the post-processings quickly and easily.

In a preferred embodiment according to the second embodiment, each of the first and second read means include a document placement member on which the document can be placed, and also image forming apparatus further includes detect means for detecting on which one of the document placement members of the first and second read means the document is placed, and start means, in accordance with a detect signal from the detect means, for starting either the first or second read means.

In another preferred embodiment according to the second embodiment, the present image forming apparatus further includes switching means which can operate the reversing means when the document consists of a plurality of documents and also which can stop the operation of the reversing means when the document consists of a single document. Thanks to this, it is possible to increase the forming speed of the image of the document consisting of a single document. In particular, for example, when placing a single document onto the document placement member, if an operator operates the change-over switch to thereby stop the operation of the reversing means, then the recording sheet after copied can be discharged as it is without being reversed, thereby being able to increase the copying speed of the single document. Here, alternatively, a state that the front and back reversing means is stopped may be defined as a normal state and the reversing means may be operated by operating the change-over switch. Which one of the above-mentioned two states is defined as a normal state can be decided properly according to cases in consideration of the needs of a user.

According to the third invention (claim 8), there is provided an image forming system including image forming apparatus having a discharge opening in the right surface thereof and a post-processing device connected with the discharge opening, wherein the image forming apparatus comprises: first read means for delivering one or more documents to a read position sequentially starting from the first document to read the documents at the above-mentioned read position, and outputting the documents in the form of images having the same posture as document images to be read on the present documents; second read means for reading a document at a position where the same is placed and outputting the document in the form of an image having the same posture as a document image to be read on the present document; image forming means for forming, on the upper surface of a sheet to be supplied from the left surface side of the image forming apparatus, the images output in the first or second step in the order that they are read, and delivering the thus formed images in a direction of the right side surface of the present image forming apparatus; and, reversing means for reversing the sheet upside down in such a manner that the upper surface of the sheet on which the images are formed in the image forming means is turned over to the lower surface of the sheet, and discharging the thus reversed sheet to the above-mentioned discharge opening, and the post-processing device performs a post-processing operation with the left side of the sheet discharged from the discharge opening as the standard of the post-processing operation.

In a preferred embodiment according to the third invention, the post-processing device includes a stapler which performs a stapling operation with the left and near side to the operator of the sheet discharged from the above-mentioned discharge opening.

For reference, as a prior art relating to image forming apparatus which carries out not only an operation to read a moving document but also an operation to read a fixed document, there is known image forming apparatus which is disclosed in the Unexamined Japanese Patent Application Publication No. Sho. 63-191469.

DETAILED DESCRIPTION OF THE PREFERRED EMBODIMENTS

Now, description will be given below of the embodiments of image forming apparatus according to the invention with reference to the accompanying drawings.

(First Embodiment)

Figure 1:
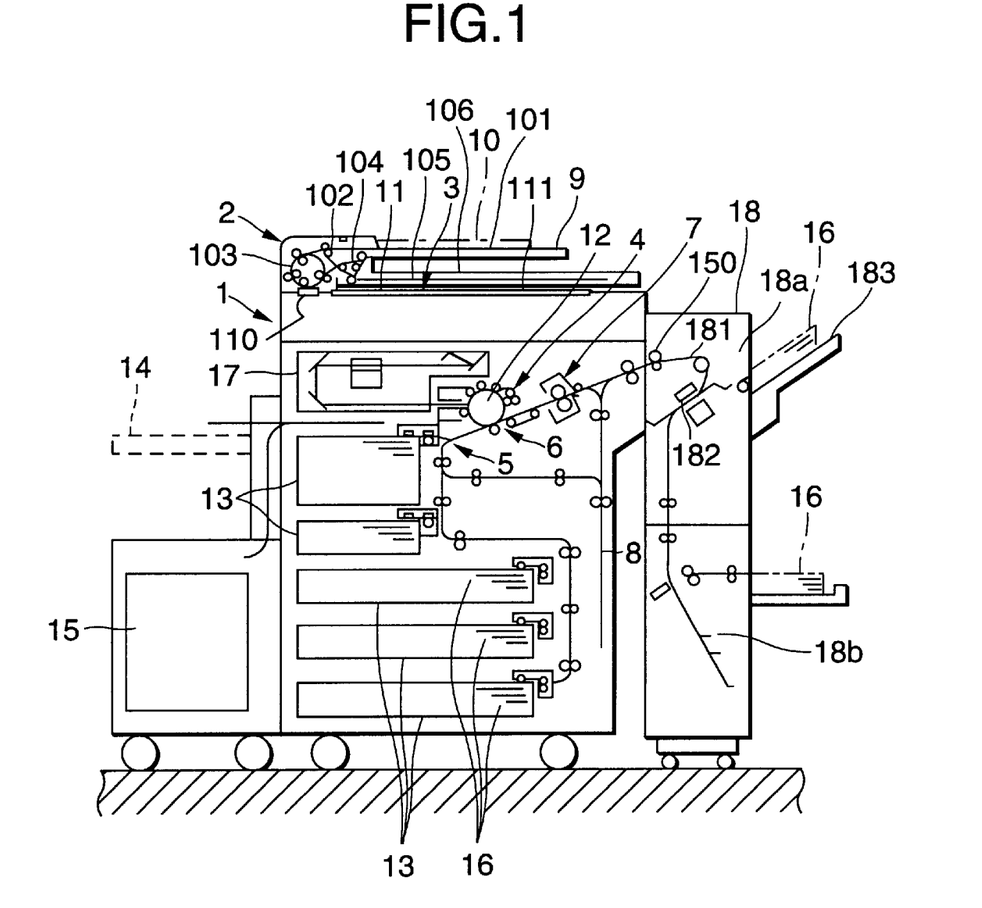
FIG. 1 is an explanatory view of a digital copying machine according to the first embodiment of the invention.

In FIG. 1, there is shown a digital copying machine according to a first embodiment of the invention. The present digital copying machine incorporates therein an automatic document feed and read device (DADF) 2 of a scan type for pulling in a document 10 from above, which is placed on a document placement member 9 in the upper portion of the machine body 1 of the copying machine in such a manner that the top and bottom sides thereof are arranged correctly and the front surface thereof faces upward, and also for reading the thus pulled-in document 10 while reversing the document 10 inside out naturally in such a manner that the front and back surfaces thereof are reversed to each other. Also, the present digital copying machine comprises a document read device 3 which includes a platen 11. Further, the present copying machine comprises an image forming device 4 which forms a visible image on a photoconductor drum (a latent image carrier) 12 in accordance with digital image information to be output from the above-mentioned automatic document feed and read device 2 or document read device 3, a sheet delivery path (delivery means) 5 for delivering a recording sheet 16 to be supplied from a plurality of main body cassettes 13, a manual insertion tray 14 or a large capacity cassette 15 in such a manner that the recording sheet 16 is allowed to pass through the lower portion of the photoconductor drum 12 from the left side of the machine body 1 toward the right side thereof and can be discharged on the right side of the machine body 1, a transfer device 6 for transferring a visible image formed on the photoconductor drum 12 onto the recording sheet 16 passing through the lower portion of the photoconductor drum 12, a fixing device 7 for fixing the visible image transferred onto the recording sheet 16, and a front and back reversing device 8 for reversing mutually the front and back surfaces of the recording sheet 16 on which the visible image is fixed.

In the first embodiment, the automatic document feed and read device 2, while allowing the front and back surfaces of the document 10 pulled in from the document placement member 3 to be reversed naturally, scans the document 10 in a positive or forward scan direction going from the left side of the document 10 to the right side thereof and reads a document image on the document 10 as digital image information having the same posture, which is positioned correctly in both of the vertical and horizontal directions (so called erect posture), as the present document image. The thus read digital image information of the erect posture is output as it is from an ESS (Electric Sub-system) 17 and is then written onto the photoconductor drum 12 of the image forming device 4.

When the automatic document feed and read device 2 is allowed to read the document 10 by means of an automatic feeding mode, for example, if a bundle of documents is placed on a document placement member 101 with the reading surfaces thereof facing upward, in a one-surface read mode, the first or upper-most document of the thus placed bundle of documents is delivered along a delivery path 102 from the right side surface 1b side of the housing 1 of the image forming apparatus toward the left side surface 1c side thereof and is then delivered in the opposite direction along a delivery path 103, whereby the first document can be read by a one-dimensional image sensor 110 such as a CCD or the like. The thus read document is then discharged along a delivery path 104 into a document discharge tray 106 which is disposed below the placement member 101. Similarly, the other remaining documents including the second document to the final or lower-most document are read sequentially in this order.

In a both-surface read mode, at first, one surface of the document, similarly as in the above-mentioned one-surface read mode, is delivered to the read position of the image sensor 110 and is read there; after then, after the thus read document is delivered to a delivery path 105 which is disposed below the document discharge tray 106, the document is delivered again upstream of the delivery path 103, whereby the already read surface of the document is turned into the inside surface thereof while the opposite surface thereof to be read newly is turned into the outside surface thereof; and, after then, the document is moved downstream along the delivery path 103 down to the read position, where the remaining surface of the document is now read by the image sensor 110.

On the other hand, when the automatic document feed and read device 2 is allowed to read the documents one by one, for example, by lifting up a handle provided on the front surface of the box body of the automatic document feed and read device 2, the box body of the automatic document feed and read device 2 journaled on the far side of the image forming apparatus to the operator can be rotated upwardly, so that a platen 111 for placing the document thereon is allowed to appear on the upper surface of the document read device 3 provided on the upper surface 1a of the apparatus housing 1. If the document is placed on the platen 111, then the scanning mechanism of the document read device 3 scans the surface of the document on the platen 111 so that the image of the document can be read.

The thus read document image is then written into the photoconductor drum 12 of the image forming apparatus 4 according to a well-known technology and thus the electrostatic latent image is formed on the photoconductor drum 12, and, after then, the electrostatic latent image is developed by a developing device.

Also, the above-mentioned document read device 3 is structured as follows: that is, the document placement standard of the platen 11 is set in the left and far position thereof to the operator, the document 10, which is placed on the platen 11 in such a manner that the back surface thereof faces up and the top and bottom sides thereof are arranged correctly, is scanned in a forward direction in which the document is scanned from the left side thereof to the right side thereof, the right and left sides of the document are reversed to each other (mirror image reversal) and the document 10 is then read as digital image information having a non-erect posture which is different from the document image on the document 10, the thus read digital image information, which corresponds to the right and left reversed document of the non-erect posture and is output from an IIT (Image Input Terminal), is reversed-upside down (mirror image reversal) by an IPS (Image Processing System), the digital image information output from the IPS is further rotated by 180° and is thereby converted to digital image information of an erect posture, the thus converted digital image information of an erect posture is output from the ESS 17 onto the photoconductor drum 12, that is, it is written into the photoconductor drum 12.

In the first embodiment, the recording sheet 16 is supplied from the main body cassettes 13, manual insertion tray 14 or large capacity cassette 15 into the lower portion of the photoconductor drum 12 of the image forming apparatus 4, and is then allowed to pass through the transfer position of the lower portion of the photoconductor drum 12 from the left to the right. The sheet delivery path 5, which is used to discharge the recording sheet 16 to the right of the machine body 1, is constructed in a generally S-shaped path which extends from the portion of the manual insertion tray 14 or large capacity cassette 15, from which the recording sheet 16 is drawn in the right direction, through the transfer position of the lower portion of the photoconductor drum 12 to the right side of the machine body 1 where the recording sheet 16 is to be discharged.

While the recording sheet 16 is passing through the transfer position of the lower portion of the photoconductor drum 12 from the left to the right, the visible image formed on the photoconductor drum 12 is transferred onto the recording sheet 16 by the transfer device 6 and is further fixed by the fixing device 7. After then, the recording sheet 16 is reversed inside out such that the front and back surfaces thereof are reversed to each other, before it is discharged to the right side of the machine body 1.

In the first embodiment, on the right side of the machine body 1, there is disposed a post-processing device 18 which is composed of a stapler portion 18a and a set holder portion 18b. That is, the post-processing device 18 is used to perform the post processings of the copied recording sheets including a stapling operation by the stapler 18a and other operations.

Next, description will be given below of the flow of the digital image information in the first embodiment with reference to FIG. 2.

At first, a digital image information 20, which is read by the automatic document feed and read device (DADF) 2 and is then output from the ESS 17 thereof, is in an erect posture, and the digital image information 20 is then mirror-image reversed (reversed upside down) and is written onto the photoconductor drum 12 which is rotating in a direction of an arrow A. Next, a visible image 21 formed on the photoconductor drum 12 is mirror-image reversed (the right and left sides thereof are reversed to each other) and is transferred to the upper surface of the recording sheet 16 which is delivered through the transfer position of the lower portion of the photoconductor drum 12 in a direction of an arrow B. The recording sheet 16 having the transferred but unfixed visible image 21 thereon is delivered as it is in a direction of an arrow B and, during this delivery, the visible image 21 is fixed. After then, the recording sheet 16 is further reversed and is discharged to a discharge opening 150 formed on the right side surface of the machine body 1 in such a manner that the back surface of the recording sheet 16 faces upwardly.

The recording sheets 16, which are discharged from the discharge opening 150, are delivered as they are along the delivery path 181 of the post-processing device 18 to the stapler 182 provided in the stapler portion 18a of the post-processing device 18, and they are collected from the first sheet to the final or the N-th sheet and are then stapled by the stapler 182 on the left and near side to the operator. After then, the bundle of the stapled recording sheets is discharged into a discharge tray 183. Therefore, when the recording sheets 16 having the visible images 21 thereon are discharged out of the machine body 1, the stapling positions 16a of the recording sheets to be stapled by the stapler portion 18a are situated on the machine body 1 side as well as on the near side to the operator of the machine body 1 and are thereby matched with the hitting position of a staple to be stapled by the stapler portion 18a.

Next, referring to the digital image information 20a that is read by the document read device 3 and is output from the IIT thereof, it can be formed in the following manner: that is, with the left and far portion of the platen 11 to the operator as the document placement standard, the document 10, which is placed on the platen 11 in such a manner that the back surface thereof faces upwardly.(that is, it is reversed inside out) and the top and bottom sides thereof are arranged correctly, is scanned in a forward direction (in a direction of an arrow SS) going from the left side thereof to the right side thereof, so that the digital image information 20a can be formed. Therefore, the digital image information 20a is a right and left reversed version of the document 10 and is in a non-erect posture. Here, the digital image information 20a, which is the right and left reversed version of the document 10 and is in a non-erect posture, is firstly reversed upside down (top and bottom mirror image reversal), whereby digital image information 20b, which is a right-and-left and top-and-bottom (upside down) reversed version of the document 10 and is in a non-erect posture, is output from the IPS. Next, by use of a page memory (not shown), the digital image information 20b is rotated further 180° to be thereby converted to digital image information 20 of an erect posture, which is then output from the ESS 17. After then, the thus output digital image information 20, similarly to the digital image information 20 of an erect posture that is read from the above-mentioned automatic document feed and read device (DADF) 2, is written onto the photoconductor drum 12, is next transferred onto the recording sheet 16 and fixed, and is then reversed inside out such that the front and back surfaces thereof are reversed to each other, before it is discharged out of the machine body 1.

Figure 2:
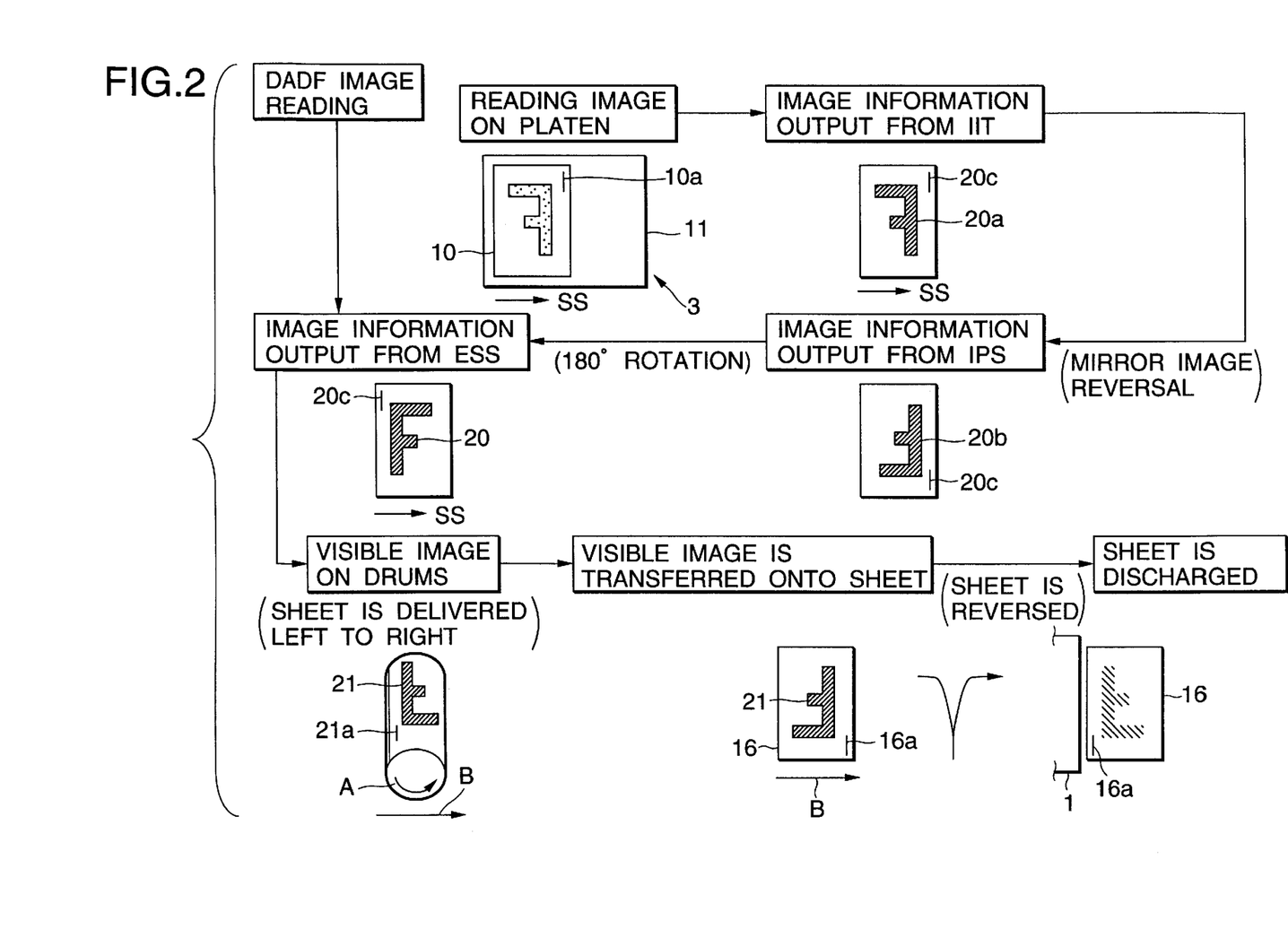
FIG. 2 is an explanatory view of the flow of image information in the digital copying machine shown in FIG. 1.

By the way, in FIG. 2, reference character 10a designates a stapling position in the document 10, 20c stands for stapling positions respectively in the digital image information 20, 20a and 20b, and 21a represents a stapling position in the visible image 21 formed on the photoconductor drum 12.

Further, in the digital copying machine according to the first embodiment of the invention, the front and back reversing device 8 includes a change-over switch (not shown) which is structured such that, when the document 10 consists of two or more sheets, it allows the front and back reversing device 8 to operate and, when the document 10 consists of a single sheet, it stops the operation of the device 8. Therefore, when placing a single sheet of document onto the platen and/or document placement member, if an operator operates this change-over switch to thereby stop the operation of the front and back reversing device 8, then the copying speed can be increased accordingly.

In addition, in the digital copying machine according to the first embodiment of the invention, although not shown, there is provided a document presence or absence detect sensor (document placement position detect means) in the automatic document feed and read device 2. That is, the document presence or absence detect sensor is used to detect where the document 10 is placed, that is, on which one of the document placement member 9 of the automatic document feed and read device 2 and the platen 11 of the document read device 3 the document 10 is placed. In accordance with a detect signal from the document presence or absence detect sensor, either of the automatic document feed and read device 2 or the document read device 3 is driven. Also, when the document 10 placed on the platen 11 is detected, the IPS is operated in order to perform an image processing which consists of the mirror image reversal→image rotation processing on the digital image information 20a that has been read.

(Second Embodiment)

Figure 3:
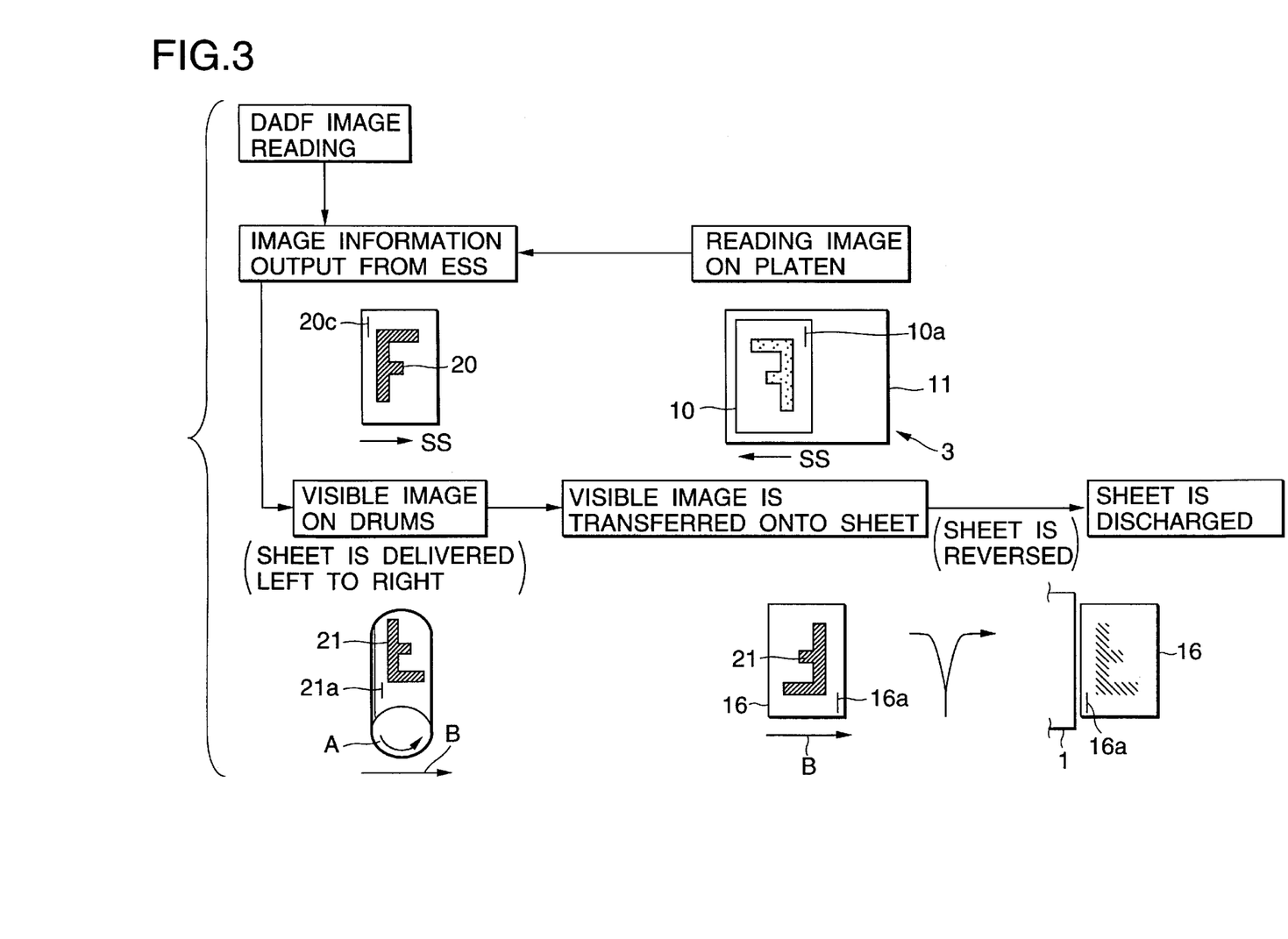
FIG. 3 is an explanatory view of the flow of image information in a digital copying machine according to the second embodiment of the invention.

Now, FIG. 3 shows the flow of digital image information in the automatic document feed and read device 2 and the document read device 3 of a digital copying machine according to a second embodiment of the invention. Unlike the digital copying machine (FIG. 2) according to the above-mentioned first embodiment, the present document read device 3 is structured such that, with the left and far portion of the platen 11 to the operator as the document placement standard thereof, it scans the document 10, which is placed on the platen 11 in such a manner that it is turned inside out (that is, the back surface thereof faces upward) and the top and bottom sides thereof are arranged correctly, in a reverse scan direction (in a direction of an arrow SS) going from the right-side of the document 10 to the left side thereof and, similarly to the automatic document feed and read device 2, outputs digital image information 20 of an erect posture from the ESS 17 thereof.

After then, as in the digital copying machine (FIG. 2) according to the above-mentioned first embodiment of the invention, the thus output digital image information 20, similarly to the digital image information 20 of an erect posture read by the automatic document feed and read device (DADF) 2, is written onto the photoconductor drum 12 and is then transferred onto the recording sheet 16 and is fixed thereon, and is thereafter reversed inside out, before it is discharged out of the machine body 1.

(Third Embodiment)

Figure 4:
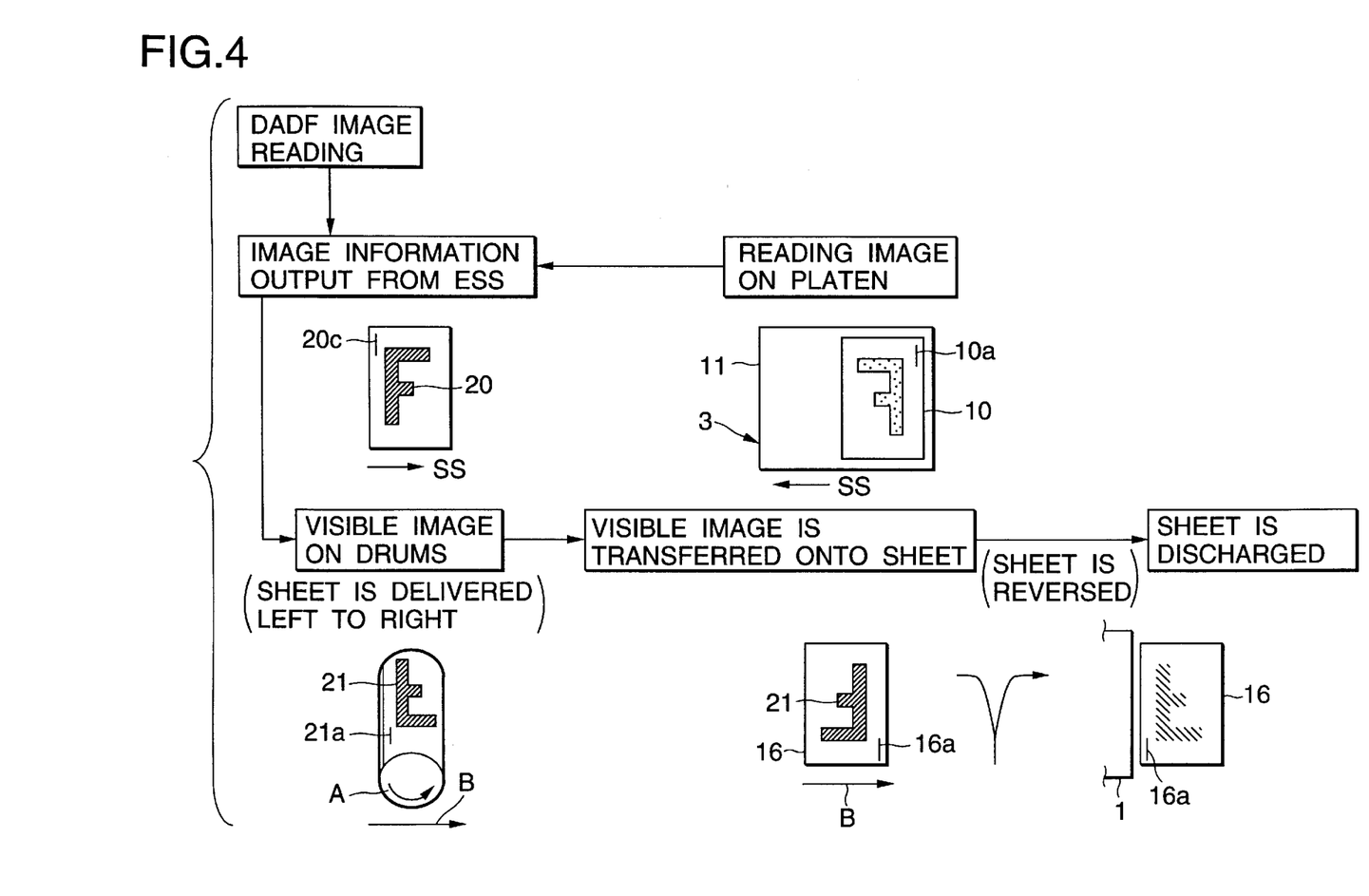
FIG. 4 is an explanatory view of the flow of image information in a digital copying machine according to the third embodiment of the invention.

Now, FIG. 4 shows the flow of digital image information which is processed in the automatic document feed and read device 2 and the document read device 3 of a digital copying machine according to a third embodiment of the invention. Unlike the digital copying machine (FIG. 2) according to the above-mentioned first embodiment, the present document read device 3 is structured such that, with the right and far portion of the platen 11 to the operator as the document placement standard thereof, it scans the document 10, which is placed on the platen 11 in such a manner that it is turned inside out (that is, the back surface thereof faces upwardly) and the top and bottom sides thereof are arranged correctly, in a forward scan direction (in a direction of an arrow SS) going from the left side of the document 10 to the right side thereof and, similarly to the automatic document feed and read device 2, outputs digital image information 20 of an erect posture from the ESS 17 thereof.

In the digital copying machine according to the third embodiment as well, similarly to the digital copying machine (FIG. 2) according to the above-mentioned first embodiment of the invention, the digital image information 20 of an erect posture that is output from the ESS 17, similarly to the digital image information 20 of an erect posture read by the automatic document feed and read device (DADF) 2, is written onto the photoconductor drum 12 and is then transferred onto the recording sheet 16 and is fixed thereon, and is thereafter reversed inside out, before it is discharged out of the machine body 1.

As has been described heretofore, according to the digital copying machine of the invention, there is provided a digital copying machine incorporating automatic document feed and read means of a scan type, which, while employing a bottom transfer technology, is excellent in the stability and reliability of the quality of an image formed as well as is excellent in the efficiency of delivery of a recording sheet after image transfer. Also, in the present digital copying machine, in order to be able to attach a post-processing device additionally thereto, the position and direction of discharge of the recording sheet can be set on the right and near side to the operator of the machine body which is suitable for the hitting positions of staples to be hit by a stapler. Further, since two or more sheets of documents can be read in the order of 1→N to thereby form the images thereof, not only is it is possible to make the best use of the strong point of a digital copying machine but also the document reading and image formation can be carried out in parallel, thereby being able to improve the copying processing in efficiency. In addition, the first copy can be discharged as fast as possible.

What is claimed is:

1. An image forming method for use in an image forming apparatus including on a right surface thereof a discharge opening connectable with a post-processing device, said apparatus selectively copying documents according to a first process or a second process, said image forming method comprising the steps of:

performing said first process by delivering one or more documents to a read position, each of said one or more documents having a document image, said one or more documents being delivered to the read position sequentially starting from the first document, reading said one or more documents at said read position while said one or more documents move past said read position, and outputting an image of each of said one or more documents, each said image having a same posture as a posture of said document image of said one or more documents;

performing said second process by reading one document while the one document is stationary at a position where the one document is placed and outputting an image of said document, said image having a same posture as a posture of said document image of said one document;

forming copied images on an upper surface of copy sheets supplied from a left surface side of said image forming apparatus, said copied images being formed from the images output by said first or said second processes in an order in which said one or more documents are read, and delivering said copy sheets in a direction toward the right surface of said image forming apparatus; and reversing each said copy sheet in such a manner that said upper surface of each said copy sheet on which said copy images are formed in said forming step is turned over to face downward, and discharging each said reversed copy sheet through said discharge opening in a desired orientation for processing by the post-processing device.

2. An image forming apparatus including on a right surface thereof a discharge opening connectable with a post-processing device, said image forming apparatus comprising:

first read means for sequentially delivering, starting from a first document, one or more documents to a read position at which said first read means reads a document image from each delivered document while each document moves past said read position, and for outputting an image of each of said one or more documents having a same posture as a posture of said document image of said one or more documents;

second read means for reading one document while said one document is stationary at a position where the one document is placed and outputting an image of said one document having a same posture as a posture of said document image of said one document;

image forming means for forming, on an upper surface of copy sheets supplied from a left surface side of said image forming apparatus, said images output from one of the first read means and the second read means in an order that the one or more documents are read, and delivering said copy sheets in a direction toward the right surface of said image forming apparatus; and reversing means for reversing said copy sheets in such a manner that said upper surface of each said copy sheet on which said images are formed by said image forming means is turned over to face downward, and discharging each said reversed copy sheet through said discharge opening in a desired orientation for processing by the post-processing device.

3. The image forming apparatus of claim 2, wherein:

said first read means reads said document images from below with respect to a document surface to be read, and said first read means delivers said one or more documents to said read position by delivering in a rightward direction, and said second read means includes:

a light transmissive document placement member on which said one document is placed;

scan means, with a left portion of said document placement member functioning as a placement standard of said one document placed on said document placement member, for carrying out a main scanning operation to scan said one document through said document placement member in a far side direction with respect to the document surface to be scanned and for carrying out a sub-scanning operation to scan said one document in a direction which extends at a right angle to said far side direction and in a same direction as said rightward direction at said read position of said first read means;

reversing means for reversing the image information obtained by said scanning operations by said scan means, in the far side direction thereof, and rotating means for rotating by 180° said reversed image information reversed by said reversing means.

4. The image forming apparatus of claim 2, wherein:

said first read means reads said document images from below with respect to a document surface to be read, and said first read means delivers said one or more documents to said read position by delivering in a rightward direction, and said second read means includes:

a light transmissive document placement member on which said one document is placed; and scan means, with a left portion of said document placement member functioning as a placement standard of said one document placed on said document placement member, for carrying out a main scanning operation to scan said one document through said document placement member in a far side direction with respect to the document surface to be scanned and for carrying out a sub-scanning operation to scan said one document in a direction which extends at a right angle to said far side direction and in a direction opposite to said rightward direction at said read position of said first read means.

5. The image forming apparatus of claim 2, wherein:

said first read means reads said document from below with respect to a document surface to be read, and said first read means delivers said one or more documents to said read position by delivering in a rightward direction, and said second read means includes:

a light transmissive document placement member on which said one document is placed; and scan means, with a right portion of said document placement member functioning as a placement standard of said one document placed on said document placement member, for carrying out a main scanning operation to scan said one document through said document placement member in a far side direction with respect to the document surface to be scanned and for carrying out a sub-scanning operation to scan said one document in a direction which extends at a right angle to said far side direction and in a direction opposite to said rightward direction at said read position of said first read means.

6. The image forming apparatus of claim 2, wherein each of said first and second read means include:

a document placement member on which said one or more documents are placed, and said image forming apparatus further comprises:

detect means for detecting on which one of said document placement members of said first and second read means said one or more documents are placed, and start means for starting either said first or said second read means in accordance with a detect signal output from said detect means.

7. The image forming apparatus of claim 2, further comprising:

switching means for operating said reversing means when a copy job includes a plurality of said documents, and for stopping the operation of said reversing means when said copy job includes a single document.

8. An image forming system including an image forming apparatus having a discharge opening in a right surface thereof and a post-processing device connected with the discharge opening, said image forming system comprising:

first read means for selectively delivering, starting from a first document, one or more documents to a read position at which said first read means reads a document image from each delivered document while each document moves past said read position, and for outputting an image of each of said one or more documents having a same posture as a posture of said document image of said one or more documents;

second read means for reading one document while said one document is stationary at a position where the one document is placed and outputting an image of said one document having a same posture as a posture of said document image of said one document;

image forming means for forming, on an upper surface of copy sheets supplied from a left surface side of said image forming apparatus, said images output from one of the first read means and the second read means in the order that the one or more documents are read, and delivering said copy sheets in a direction toward the right surface of said image forming apparatus; and reversing means for reversing said copy sheets in such a manner that said upper surface of each said copy sheet on which said images are formed by said image forming means is turned over to face downward, and discharging each said reversed copy sheet to said discharge opening, and said post-processing device performs a post-processing operation with a left portion of each said copy sheet discharged from said discharge opening as a standard of said post-processing operation.

9. The image forming system of claim 8, wherein:

said post-processing device includes a stapler for stapling each said copy sheet with a left and a near side of each said copy sheet discharged from said discharge opening as the standard of said post-processing operation.

* * * * *